United States Patent [19]

Gluntz et al.

[11] Patent Number: 4,818,475

[45] Date of Patent: Apr. 4, 1989

[54] TURBINE-GENERATOR SHAFT-COUPLED AUXILIARY GENERATORS SUPPLYING SHORT-DURATION ELECTRICAL LOADS FOR AN EMERGENCY COOLANT INJECTION SYSTEM

[75] Inventors: Douglas M. Gluntz, San Jose; James C. Black, Morgan Hill, both of Calif.

[73] Assignee: General Electric Company, San Jose, Calif.

[21] Appl. No.: 155,433

[22] Filed: Feb. 12, 1988

[51] Int. Cl.⁴ .............................................. G21C 15/18
[52] U.S. Cl. ..................................... 376/282; 60/658; 376/322
[58] Field of Search ........................... 60/658; 290/52; 376/277, 282, 317, 322

[56] References Cited

U.S. PATENT DOCUMENTS 4,104,119 8/1978 Schilling .............................. 376/282

FOREIGN PATENT DOCUMENTS 1133084 11/1968 United Kingdom ................ 376/298

Primary Examiner—Deborah L. Kyle
Assistant Examiner—Richard W. Wendtland
Attorney, Agent, or Firm—Robert R. Schroeder

[57] ABSTRACT

An improved boiling water reactor emergency coolant injection system network uses condensate pumps in the feedwater train to function in alternate duty as short-term low-pressure coolant injection pumps. These low-pressure pumps use a reliable power supply consisting of the addition of one or more auxiliary generators, of small size and generating capacity relative to the size of the power station's main generator, which are direct-coupled mechanically to the shaft of the main turbine-generator and which use the spindown energy of the main turbine-generator to power the low-pressure coolant injection pumps.

9 Claims, 4 Drawing Sheets

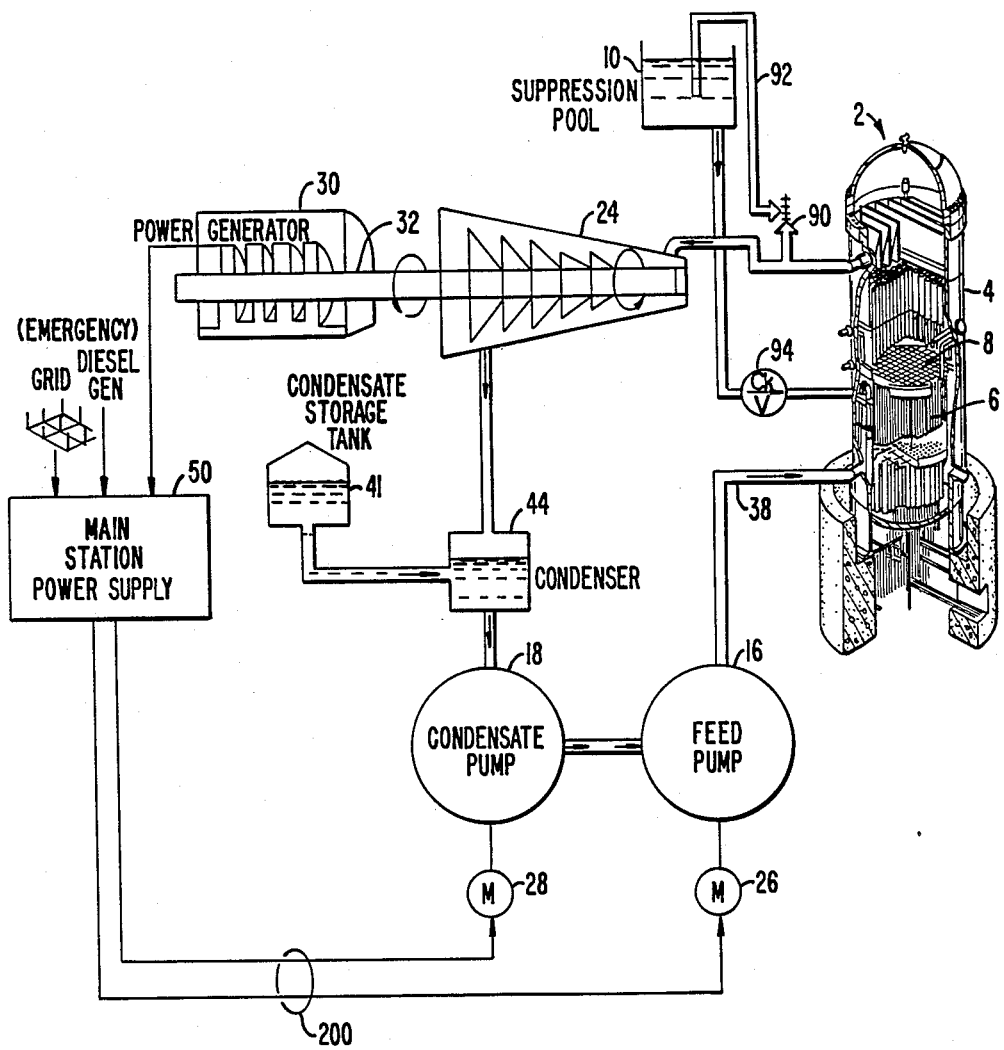
FIG._1. (PRIOR ART)

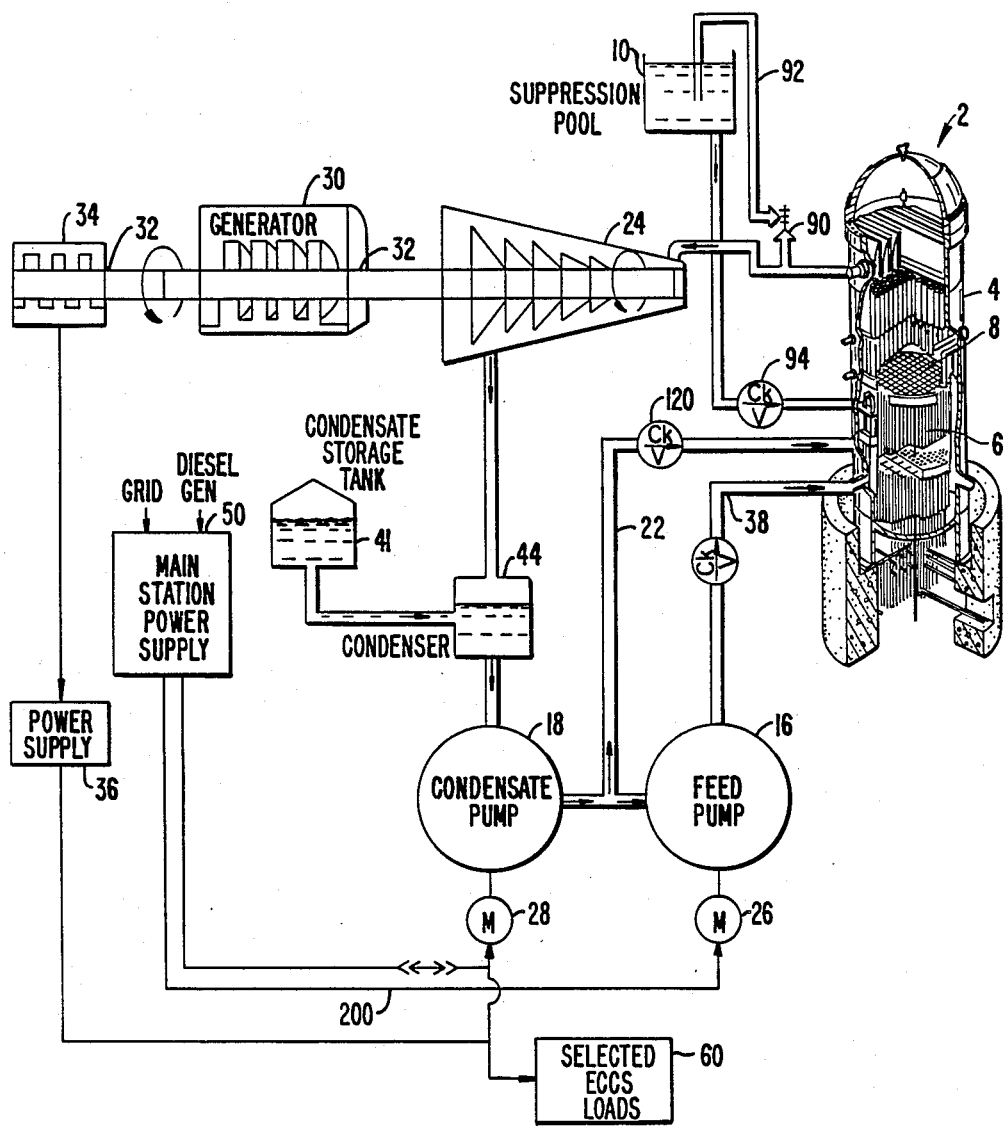
FIG._2.

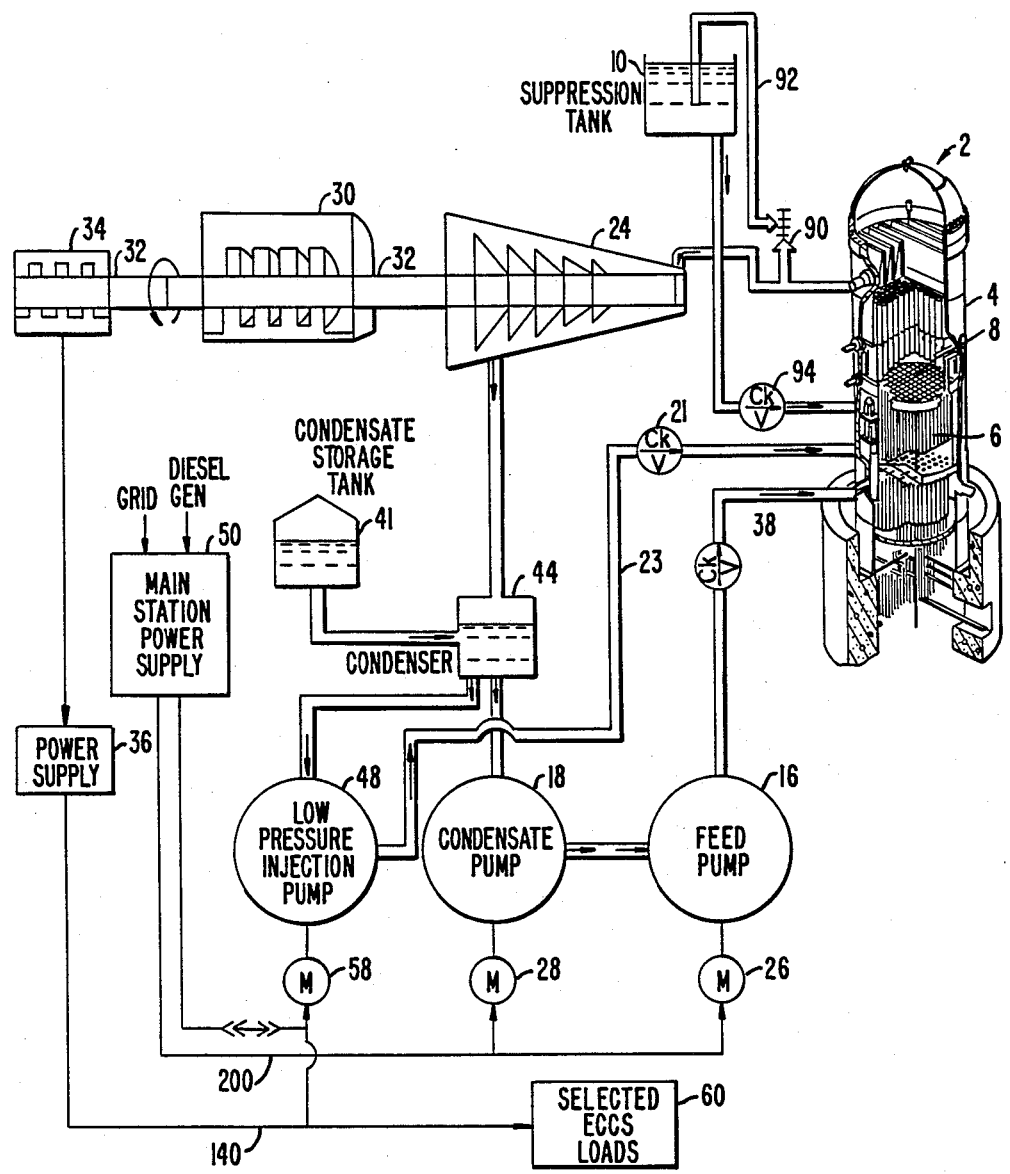
FIG._3.

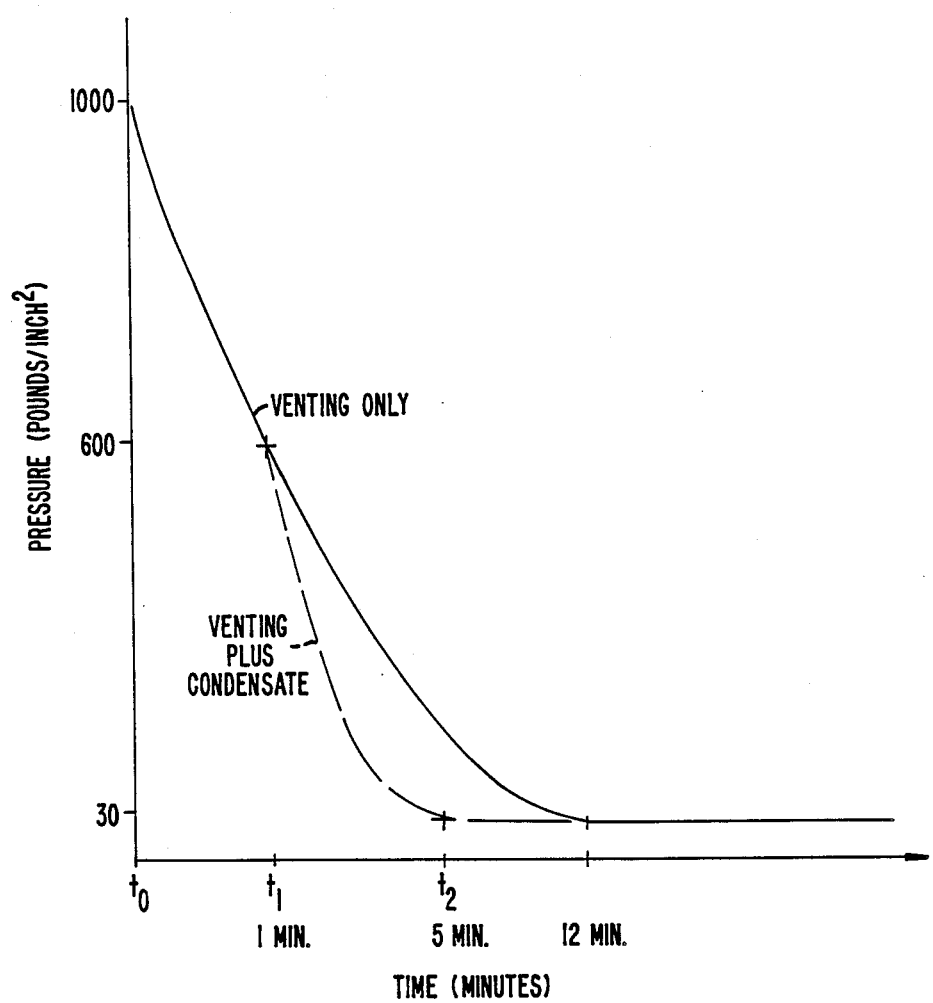
FIG._4.

TURBINE-GENERATOR SHAFT-COUPLED AUXILIARY GENERATORS SUPPLYING SHORT-DURATION ELECTRICAL LOADS FOR AN EMERGENCY COOLANT INJECTION SYSTEM

The present invention relates to emergency core cooling system (ECCS) networks for nuclear power reactors. More particularly, the invention is preferably designed to compliment advanced boiling water reactor (BWR) designs known as simplified boiling water reactors (SBWRs). Under the invention as applied to SBWRs, reactor coolant inventory is replenished, in a backup mode to the safety-grade emergency core cooling system, at an early point following a loss-of-coolant accident. The spindown energy of the main turbine-generator is used to drive selected pumps such as the condensate pumps to achieve desired initial injections of emergency coolant into the reactor.

BACKGROUND OF THE INVENTION

The feedwater supply system for many conventional boiling water reactors and especially for simplified boiling water reactors (collectively referred to as BWRs) is a conventional yet simplified system, characterized by two stages of pumping. These pumping stages raise the feedwater from the below-atmospheric pressures at the source of the feedwater flow—namely, the condenser hotwell—to the pressures needed for injection into the BWR feedwater spargers positioned inside the reactor. The first or lowermost pumping stage, customarily termed the "condensate" stage, contains condensate pumps having pump discharge pressures, at design flow, of approximately 500 psig, with shutoff heads of approximately 600 psig. The second or uppermost pumping stage, customarily termed the "feedwater" stage, contains feedwater pumps capable of increasing the feedwater supply pressure to approximately 1250 psig.

The pumping burden, at both stages, is commonly shared by redundant pumps. For example, a configuration featuring three condensate pumps (and also three feedwater pumps) each having 50% rated flow capacity is one attractive configuration. One pump from each stage may be held in a standby mode, to be brought into service in case an operational pump requires shutdown for any reason.

During normal operation, these pump units are motor-driven by power from the main station power supply, with the feedwater pumps having adjustable-speed drives to provide feedwater regulation to the reactor. However, during some loss-of-coolant accidents (LOCAs), the reactor must be supplied with additional coolant and cooled—that is, the reactor coolant level must be maintained high enough to cover all of the reactor nuclear fuel assemblies. Such additional coolant must be supplied by reliable emergency cooling systems which draw power from reliable alternative sources.

Loss-of-coolant inventory conditions may occur because of a pipe break (i.e., a LOCA), loss of feedwater supply, or because a safety-relief valve has stuck-open and failed to reclose following a transient. Coolant must be maintained, or must be rapidly replenished following its loss during such accident conditions, to keep the reactor core supplied with coolant to counteract core decay heat generation. These systems which must function to prevent exceedence of core temperature limits comprise the "emergency core cooling network" (ECCS). Core decay heat generation results from the radioactive decay of fission products and continues even after the fission itself has stopped.

In addition, coolant inventory is depleted within the reactor through processes of boiling and evaporation as the hot reactor coolant continues to receive decay heat from the core. As a result, an intermittent or even continuous replenishment of coolant is needed in the long term. The replenishment rates may be large immediately following an accident. Thereafter however, replenishment rates diminish as time goes on and the decay heat generation rate decreases. Except for very small LOCAs, replenishment of coolant must continue until the break can be isolated and normal coolant inventory level reestablished inside the reactor. For certain accidents, replenishment must continue until the region of the containment immediately outside the reactor pressure vessel can be flooded to an elevation above the top of t he core active fuel level or the break, whichever is higher.

Several emergency core cooling systems with independent power supplies have evolved for responding to a LOCA for nuclear power reactors in general and for boiling water reactors in particular.

Conventional BWR ECCS networks, for example the BWR/3 through the BWR/6 model BWR designs by GE Nuclear Energy, utilize a combination of pumping systems and power supplies to pump coolant into the reactor following any loss-of-coolant inventory condition.

Water is typically used as the emergency coolant for BWRs. The source of water can be any available quantity of water within the power station or its premises. For example, the BWR/3 through BWR/6 reactors typically draw emergency coolant from a containment suppression pool. This suppression pool provides water which is assured, is available in large amounts, and is generally of a quality that is not particularly harmful to the reactor vessel or the nuclear steam supply system piping or equipment.

Because the containment suppression pool is conventionally located low in the containment relative to the higher-elevation nuclear reactor, a break in certain pipes connecting to the reactor can allow injected coolant to be drained back out of the vessel. Such BWR designs result in extremely long pump-operating requirements for the pumping systems that provide the necessary emergency coolant inventory replenishment action.

Thus, the conventional BWR designs have several drawbacks relating to emergency core cooling resulting from the extremely long pump duty cycles needed to meet coolant replenishment requirements. For example, both the pumps and the piping networks as well as the power supplies that power the ECCS have heretofore been costly dedicated systems having high reliability ratings. Such high reliability ECCS design often is achievable only by providing redundant components or even redundant pumping loops. Such redundancy in systems results in significant cost increases for the power station.

It is possible to use the main system generator as a source of power for ECCS pumps during some LOCAs. However, in some important accident scenarios, electrical power from the main generator is hypothesized to be unavailable. For example, the main generator itself may be in a shorted condition (e.g., shorted windings), or the main generator may otherwise have been taken offline during the LOCA.

For conventional BWRs, safety-grade diesel generators are installed that supply the necessary reliable ECCS network electrical power. These diesel generators are used where in-house electrical power has been interrupted from the generally two independent offsite grid power supplies into the station, as well as from the power station main turbine-generator. (The power station's in-house ("hotel") load can be furnished by the station main turbine-generator, but only if the reactor steam source has not become isolated.)

A loss of power from these preferred sources would result in the automatic start-up of the diesel generators, and the subsequent progressive loading onto their emergency buses of the motor loads for ECCS pumps and other emergency equipment. For conventional systems, such diesel generators must be rated to operate continuously for as long as 90 days and typically must have an 8-day supply of fuel on hand.

Advanced simplified types of BWRs—termed SBWRs—position the suppression pool previously discussed at a high elevation in the containment vessel relative to the core top-of-active-fuel (TAF) elevation. This elevation of the suppression pool overcomes the long-term need for continuous pumped coolant injection into the reactor. The suppression pool is connected via a plurality of pipes directly to the reactor, with valves—typically check valves—that prevent the discharge of high-pressure reactor coolant into the suppression pool during routine reactor power generation. This system of pipes and valves is termed a "gravity-driven cooling system (GDCS)", and along with associated venting systems, represents the entire ECCS network for certain SBWRs.

If a loss-of-coolant inventory condition occurs, as detected by reactor water level measurements, the SBWR reactor is promptly depressurized to the suppression pool pressure level using a venting system. When the reactor pressure has fallen to a low pressure level (such as 30 psig), the hydrostatic head created by the elevated suppression pool initiates flow of suppression pool water into the reactor. The suppression pool includes sufficient water such that during a LOCA, both the reactor as well as the region of the containment external to the reactor (the "drywell") can be flooded to a level moderately higher than the TAF level.

The maintenance of adequate reactor coolant inventory in these SBWRs thus no longer depends at any time on coolant inventory replenishment (pumping) by ECCS pumps. The flooding of the reactor and/or drywell by the GDCS using suppression pool water keeps the reactor core inundated. Any boiloff of evaporated coolant passes to the suppression pool through latched-open depressurization valves, and returns to the core by gravity refill via GDCS pipelines.

A design goal for SBWR is not only to avoid exceeding core temperature limits during the course of any design basis accident, but also to provide ample margin against such occurrence. This assured margin is attained by specifying no core uncovery condition shall occur, even briefly, during such accidents. However, any added systems that provide this margin are not required to meet safety-grade design criteria, and these systems are taken as backups to, but not part of the ECCS network itself.

The advantage to added or backup systems that are not required to be part of the ECCS network is that they can be designed to less-stringent criteria, which translates to less expense. At the same time these added or backup systems provide important enhanced investment protection to the power station because they further reduce the risk of core damage given an accident.

To insure adequate coolant inventory (margin) in the short term while the reactor is undergoing depressurization—before the initiation of GDCS flow—the SBWR reactor vessel is designed to contain excess water, relative to conventional BWRs. This extra water is contained in a zone starting with the TAF and extending up to the water level at which reactor depressurization signals are initiated (termed "Level-1"). Thus, those SBWRs which use gravity driven cooling can undergo depressurization—which entails a reduction of steam/water inventory from inside the reactor—and still maintain a sufficient vessel residual coolant inventory. The coolant inventory maintains adequate coverage of the core as the reactor is depressurized to low pressure levels.

The zone between TAF and Level-1 in such SBWR reactor designs contains an amount of water corresponding to approximately one minute of rated feedwater flow injection. This amount is substantially larger than in conventional BWR designs which rely on long term ECCS pumped water injection into the reactor during and following reactor depressurization.

Unfortunately, this excess volume leads to a taller reactor vessel, which in turn leads to a larger drywell and larger suppression pool, and thus greater costs for both the reactor vessel and containment.

SUMMARY OF THE INVENTION

According to the invention there is provided an improved, reliable, low-cost electrical power supply and coolant injection system useful in such applications as the ECCS network for SBWRs. The invention uses one or more dedicated auxiliary generators, of small size and generating capacity relative to the size/capacity of the power station's main generator, which are direct-coupled mechanically to the main turbine-generator. During normal plant operations, electrical power derived from these auxiliary generators is the preferred power supply to the station condensate pump-motors. During accident conditions, while the turbine-generator undergoes a spindown transient, these condensate pumps remain connected to their respective auxiliary generators to maintain pumping of condensate into the reactor. This continued pumping of condensate begins the emergency introduction of condensate from the moment when the depressurized condition inside the reactor exceeds the current shutoff head capacity corresponding to the condensate pump motor speed.

As stated, the generators are used to supply the electrical power for the aforesaid loads—for example, condensate pumps—during normal station operation. During LOCAs, no start-up of alternate power sources is required to effect continuation of function, or switch-over of function to ECCS service.

The invention thus eliminates one of the principal causes for unreliability for conventional ECCS networks—namely, the start-up of the diesel-generator. This configuration of condensate pumps powered by auxiliary generators (preferred source) also avoids the cost of providing separate dedicated emergency injection pumps and diesel generators. Due to provision of emergency coolant replenishment according to the invention, the cost of providing extra volume (described as TAF-to Level-1 volume) inside the reactor vessel and the suppression pool is additionally minimized.

In an alternative embodiment, the short term power supply permits slow-coastdown of upper-stage feedwater pumps during transients involving loss-of-offsite-power.

In a preferred embodiment, the shaft-coupled auxiliary generator and the pump-motors to which they are connected are designed to non-safety-grade criteria. In an alternative embodiment, these components are all designed as safety-grade components.

BRIEF DESCRIPTION OF THE DRAWINGS

FIG. 1 is a block diagram of a prior art simplified boiling water reactor and associated emergency core cooling systems for normal and loss-of-coolant inventory accident conditions.

FIG. 2 is a block diagram of an improved simplified boiling water reactor and associated emergency core cooling systems according to one embodiment of the invention.

FIG. 3 is a block diagram showing an alternative embodiment of the invention.

FIG. 4 is a graph showing reactor depressurization curves for a simplified boiling water reactor with and without improved emergency coolant injection according to the invention.

DETAILED DESCRIPTION OF THE DRAWINGS

FIG. 1 is a simplified block diagram for a simplified boiling water reactor 2 of prior art configuration. Reactor 2 includes a reactor pressure vessel 4 which has disposed therein a reactor core 6. The reactor core is covered by cooling water 8 which is supplied and circulated during normal operation. Normal operation can be simply summarized. As shown in FIG. 1, steam from the reactor vessel 4 is input to turbine 24. Turbine 24 is coupled to generator 30 through the main rotating shaft 32 of turbine 24. The power output of generator 30 is coupled to the main station power supply 50.

Exhaust of turbine 24, in the form of wet steam, is fed to condenser 44. Condensate from condenser 44 flows to the suction of condensate pump 18.

Condensate discharged from condensate pump 18 is fed to the suction of feed pump 16. Feed pump 16 elevates the head of the feedwater to exceed reactor vessel pressure and supplies feedwater through feedwater line 38 back to the reactor vessel 4, thereby completing the steam cycle.

When a loss-of-coolant inventory accident occurs, the reactor vessel is depressurized through depressurization valve 90 and vent line 92 to suppression pool 10. When depressurization has progressed to an appropriate degree, reactor 2 becomes cooled by the gravity injection of suppression pool coolant through check valve 94.

Backup cooling is conventionally provided using power from a main power supply 50 to power feedwater (cooling) system 200. The emergency power may be provided from either the main coupled generator 30, the grid, or from diesel generators (not shown).

FIG. 2 is an illustration of an improved emergency core cooling system according to one embodiment of the invention. FIG. 2 shows the conventional prior art boiling water reactor 2 having the emergency core cooling system according to one embodiment of the invention. FIG. 2 shows the conventional prior art boiling water reactor 2 having the emergency core cooling system featuring a low pressure coolant injection capability. A steam output from the turbine-generator 24 inputs to condenser 44. A condensate storage tank 41 supplements the inventory of condensate within the condenser 44 to replenish water inventory within condenser 44 whenever reactor steam supply becomes isolated.

Output of condenser 44 is coupled to condensate pump 18. The output of condensate pump 18 has two separate destinations. The first conventional destination is to the suction of feed pump 16. The second destination is to the upstream side of a check valve 120 on a bypass line 22. The output of check valve 120 is coupled to the interior of reactor vessel 4. The bypass line 22 and check valve 120 may be configured to tie into feedwater line 38 or into a dedicated injection inlet to vessel 4.

During normal operation, pressure in the reactor vessel 4 exceeds pressure at the output of condensate pump 18. Check valve 120 in line 22 prevents reverse flow from reactor vessel 4 toward condensate pump 18. This condensate pump 18 and feed pump 16 function normally in series to provide conventional feedwater flow.

As further shown in FIG. 2, an auxiliary generator 34 is coupled to a main shaft of the coupled main generator 30 and turbine 24. The output of auxiliary generator 34 is coupled to an input to power supply 36. Power supply 36 is dedicated to driving pump motor 28. This condensate pump 18 has a dedicated power supply from generator 34.

Pump motor 28 drives condensate pump 18 using power generated by auxiliary generator 34. Power supply 36 is normally directly connected to motor 28 without any intervening switching or bus transfer required. Auxiliary generator 34 provides normal short-term-response power for motor 28 when condensate pump 18 is used during normal initial core cooling. Auxiliary generator 34 converts the rotational energy of main turbine and main coupled generator into electric power, including converting the spindown momentum during loss-of-coolant inventory accidents.

Operation of the condensate pump 18, bypass line 22 and check valve 120 during a loss-of-coolant inventory accident can be understood. Specifically, and even though main generator 30 is inoperative and completely decoupled from the main station power supply 50, auxiliary generator 34 will continue to generate power from the available and coupled spindown momentum. This being the case, condensate pump 18 will continue to operate.

Discharge of the condensate pump 18 will temporarily be interrupted. Such interruption will occur because main feed pump 16 will likely be offline because of the power failure. Thus condensate pump will output its discharge head to check valve 120. Because of the loss-of-coolant accident pressure in the reactor will fall.

When pressure in the reactor reaches a pressure below the shutoff head of the condensate pump, the flow of coolant into the reactor will resume. Such flow will be from the discharge of the condensate pump 18, through line 22 and check valve 120, and directly into the reactor vessel. As will be hereafter emphasized, this flow of coolant to the reactor replacing lost coolant will occur much earlier than has heretofore been possible; it will occur from the moment when reactor pressure falls below the shutoff head of condensate pump 18.

I have preferably used the resident condensate pump 18 to supply coolant to the reactor vessel 4. The reader will realize that in some nuclear reactor designs it may be desirable to have a separate dedicated low pressure injection pump 48 and driving motor 58 to accomplish this function. Such an embodiment is illustrated in FIG. 3.

FIG. 3 is a coolant flow of an alternative embodiment of the invention. Low pressure injection pump 48 intakes coolant derived from condenser 44 and discharges the coolant through injection line 23 and injection check valve 21 into reactor vessel 4. It is required that low pressure injection motor 58 and pump 48 be signalled and brought on line responsive to conventional prior art reactor water level indicators. Auxiliary generator 34 provides power to motor 58 driving low pressure injection pump 48. While this alternative embodiment represents potential cost increases resulting from the addition of a new pump/motor unit and its connecting piping, there are potential major net cost reductions to the resultant overall system depending on the sizing of pump/motor unit 48/58.

Operation of the embodiment of FIG. 3 is easily understood. A bypass low pressure coolant injection (LPCI) line 23 is provided. Line 23 incorporates a normally-closed LPCI flow injection valve 21 located upstream of an LPCI injection nozzle. LPCI injection nozzle is positioned on the reactor vessel 4 and communicated to the discharge side of LPCI pump 48.

Under certain conditions, a loss-of-coolant accident, loss-of-station power, loss-of-coolant inventory accident, or another such emergency core cooling event could (in worst-case scenario) cause loss of the normal feedwater supply to the reactor. Reactor 4 through conventional prior art sensors senses a loss-of-coolant inventory condition and begins depressurization through sequentially-opened depressurization valves 90 once the water level inside the reactor 4 reaches the Level-1 level. When reactor 4 has depressurized to approximately the pump shutoff head developed by pump 48, the bypass line injection valve 21 opens to admit pumped condensate to the reactor. As the reactor depressurizes further, the LPCI flow tends to increase—this effect being caused by the characteristic of centrifugal pumps to provide increased volume throughout as pump back-pressure decreases—but may (depending on LPCI motor controls) be partially offset by the reduction in rotational speed (referred to as coastdown or spindown) of the main turbine-generator as a consequence both of turbine-generator bearings and windage losses as well as energy removed for pumping.

For the most-challenging design accident scenarios, the depressurization from reactor normal conditions (1020 psig) down to the pressure at which LPCI flow injection can begin (600 psig or lower, depending on design optimization for LPCI pump 48) takes approximately one minute. Thereafter, LPCI flow into the reactor vessel begins. For the same challenging accident scenarios, the reactor depressurizes over the next four minutes down to a pressure at which water from suppression pool 10 begins flowing into the reactor.

Referring back to FIG. 1 for conventional simplified boiling water reactors, the main turbine-generator would supply power to the main station (site) power supply. The site power supply 50 would supply power to feed pump 16 and to a condensate pump 18 during normal operations. For backup coolant inventory replenishment, grid power sources and/or non-safety-grade diesel generators, as available, are coupled via bus transfer to the feed pump and to the condensate pump to provide alternate power for the requisite pumping during a loss-of-coolant inventory accident. It will therefore be realized the power supply for backup emergency cooling according to the disclosed invention is inherently more reliable over the duration of power supply need, because of the avoidance of requiring start-up of diesel generators and/or because of the avoidance of bus transfers from electrical buses that are subject to externally-caused power interruptions.

As shown in FIG. 2, the emergency coolant injection power supply for the low pressure coolant injection capability is furnished by dedicated, unswitched normal and emergency power from auxiliary generator 34 to the condensate pump 18. The auxiliary generator 34 also can supply normal and emergency power to selected other emergency core cooling system loads 60.

During normal operation, the feed pumps, which draw substantial power (on the order of several megawatts) are fed from the site power supply 50 over normal lines to a power input to drive motor 26 of feed pump 16. According to the invention, it is possible to couple dedicated normal and short term emergency power from the auxiliary generator 34 over a power supply line to an input to a plurality of individual motors and their associated coolant injection pumps. For example, where feedwater is used to power the recirculation flow in a boiling water reactor—such as in the case of a feedwater-driven jet pump recirculation system BWR—the feature of having short-term continued feedwater injection capability is highly desirable. The invention brings about the capability of being able to maintain coolant forced circulation in such reactors over the short term of depressurization experienced in a loss of coolant accident.

FIG. 4 is a graph that depicts the reactor depressurization curve for a conventional simplified boiling water reactor that uses a venting system together with a gravity-driven cooling system. This same graph also depicts improved system in accordance with the invention. This improved system uses a venting system, a gravity-driven system, and short term low pressure coolant injection capability to inject condensate into the reactor vessel during the depressurization phase, at the early part of a loss-of-coolant inventory accident.

As shown in FIG. 4, time $t_0$ represents the time at which an event requiring emergency core cooling occurs. Before and until time $t_0$ the pressure in the reactor vessel will be approximately 1000 psig at the point in time when venting is initiated. According to the prior art boiling water reactor gravity-driven cooling system, the reactor vessel would be depressurized down to about 30 psig over approximately a 10–12 minute interval using the venting system.

The improved performance of this invention is illustrated in FIG. 4 in broken lines. Using the protocol of either FIG. 2 or FIG. 3, condensate is pumped back into the reactor vessel using the emergency power supply system and condensate (low pressure) pumps. Such introduction of condensate occurs when the reactor/injection vessel pressure reaches the shutoff head for the condensate (low pressure) pump which is around 600 psig. With this earlier induced coolant flow, it is important to realize the depressurization curve for the reactor vessel can be accelerated. Specifically, the reactor vessel can be depressurized down to 30 psig at some $t_2$ which is several minutes earlier than for the conventional system. The injection of coolant and the more rapid resulting depressurization facilitates a reduction in the volume of coolant required in the TAF to Level-1 zone and in the suppression pool. This reduced depressurization also permits a reduction in the number of valves and the venting capacity required for the depressurization system.

The water provided by the LPCI pump (per FIG. 3 embodiment) or by the condensate pump (per FIG. 2 embodiment) using the spindown energy of the turbine generator during the four-minute period provides reliable, low cost, short term emergency coolant. This coolant undergoes injection with considerable margin relative to the volumetric inventory between TAF and Level-1.

The reader will understand further that the total volume of water in the reactor is subject to reduction. This reduction occurs for at least the following three reasons.

First each LPCI pump (condensate pump) is producing nominally 50% rated feedwater flow.

Second, the depressurization period necessary to bring the vessel pressure down to 30 psig, over which reactor inventory depletion occurs by venting coolant through the depressurization valves, is limited to four minutes as compared to 10 to 12 minutes with no injection.

Finally, multiple LPCI and/or condensate pumps are available to recharge the reactor with coolant.

As earlier discussed, only one minute of rated feedwater flow is necessary to supply the requisite water volume. The volume represented in the conventional SBWR reactor between TAF-and-Level-1 can be correspondingly reduced. Thus, the resulting flow rate (50%) times the duration (4 minutes) provides a minimum of 2 minutes of rated-power-flow even assuming that only one LPCI pump (or condensate pump) is available.

It is noted that during the initial moments of an event requiring emergency core cooling, prior to start of LPCI injection, the recirculation line customarily provided on such pumps recycles a small portion of discharge flow back around to pump suction. (This type of piping configuration line is a conventional engineering practice which prevents unwelcomed overheating of deadheaded pumped fluid).

According to the invention, the amount of required injection flow is thus seen to be small relative to the BWR/3 through the BWR/6 model BWR designs that require coolant flow injections uninterrupted for indefinitely long time periods. Since the integrated pumping energy demand over the period of interest—said to be no longer than five minutes even under worst-case event scenarios—is demonstrably small, the invention is able to use the spindown energy of the main turbine-generator as an assured, virtually cost free source of emergency power.

The turbine-generator of the typical BWR power station, separated from its load, typically requires no less than 40 minutes to spindown to speeds at which the turbine-generator turning gear cuts-in to maintain slow revolutions on the turbine-generator shaft. This coastdown is produced by the combination of frictional drag from bearings, plus windage losses by the turbine-generator blades spinning in the low pressure (typically 2-3 ins.Hg) maintained by the main condenser. For example, for a 600 MWe turbine-generator, approximately 1.5 MWe-equivalent drag is produced at the 1500 rpm (50 cycle)/1800 rpm (60 cycle) initial free-rotation speed. (Actually, when the turbine-generator is separated from its load, residual steam in the turbine-generator casing momentarily causes the turbine-generator to go into an overspeed mode, so that coastdown actually begins from a still higher rpm.)

The energy extracted by the shaft-coupled auxiliary generator(s) and consumed by the electrically-coupled LPCI and/or condensate pumps amounts to the same order-of-magnitude rate as for the turbine-generator bearing and windage losses. Thus, the 4 or 5 minutes integrated energy drawn by the LPCI and/or condensate pumps can be seen to be modest relative to the integrated energy available from the turbine-generator coastdown.

In the event certain specific applications of the invention were to find an insufficiency of rotational energy in the turbine-generator system to accomplish the full desired short-duration coolant injection pumping burden, a properly sized flywheel can be added to the turbine-generator system to provide the additional rotational energy required.

It is within the scope of the invention to provide emergency power from the auxiliary shaft-coupled generator to supply short-term power to the adjustable speed drives of the feedwater pumps which are located downstream from the condensate pumps in the feedwater train. As a result, feedwater flow can be continued into the reactor under loss-of-offsite-power events in which the reactor feedwater injection lines do not become shut closed. Under these conditions, the continued supply of feedwater could be critical to avoiding violation of certain safety-limit margin conditions. As one example, if the core recirculation flow for the SBWR reactor were of the forced-circulat ion type based on feedwater-driven jet pumps, then supplying drive power to the feedwater pumps in the manner described by this invention would produce the cited advantage.

It is also possible to use the auxiliary generators to power other existing, or new, emergency core cooling loads. These loads can include opening or closing certain motor-operated valves, or providing power for forced injection of coolant from the elevated suppression pool into the reactor vessel to accelerate depressurization of the reactor vessel. It is also possible to conserve the useful energy of the short term power supply, for example, by not switching the LPCI pump on (in the FIG. 3 embodiment) until the reactor vessel pressure has fallen below the shutoff head for the LPCI pump. Further, it is also possible to use feedwater pumps and condensate pumps either in combination or in a staggered timing relationship depending on design constraints. It is also possible within the scope of the invention to use separate dedicated LPCI pumps and injection lines that tie into the normal condensate line.

It is also within the scope of the invention to couple power from the auxiliary generator to a main station transfer bus. It is possible to supply during normal operation the condensate pump with power derived directly from the main coupled generator feeding this main transfer bus. After occurrence of a loss-of-coolant inventory accident, the main bus could switch so that power would be provided from the auxiliary generators. This approach obviously lacks the higher reliability feature of those embodiments not requiring any switching.

Other changes and modifications to the disclosed embodiments other than the foregoing may be made as will be readily apparent to those skilled in the art within the scope and spirit of the invention. Accordingly, it is applicants' intention that the invention be therefore limited only by the appended claims.

What is claimed is:

1. In a nuclear reactor having a water coolant with said water coolant being heated in said reactor to drive a turbine and coupled main generator for supplying output power,
   an improved emergency coolant injection system for supplying water coolant to said reactor during a loss-of-coolant inventory accident, said system comprising:
   a second generator mechanically coupled to said main generator and turbine, said second generator converting rotational energy of said turbine and coupled main generator into electric power, including converting the spindown momentum of said turbine and said coupled main generator to electric power;
   a reactor coolant injection pump, said pump having an inlet coupled to a source of coolant for said reactor and an outlet for providing said coolant to the interior of said reactor;
   an electric pump motor directly coupled to said reactor coolant injection pump for driving said reactor coolant injection pump; and
   a dedicated power supply, said dedicated power supply originating at said second generator and supplying power to said electric pump motor coupled to said reactor coolant injection pump,
   whereby core coolant can be supplied to said reactor during a loss-of-coolant inventory accident using the spindown momentum of said turbine and said coupled main generator.

2. The invention of claim 1 wherein said reactor coolant injection pump is a condensate pump.

3. The invention of claim 2 and wherein said outlet for said reactor coolant injection pump includes a line for bypassing a downstream feedwater pump.

4. The invention of claim 1 and wherein said dedicated power supply includes a direct electrical connection from said second generator to said electric pump motor.

5. In a nuclear reactor power plant system for supplying power to a main grid, said power plant system including:
   a reactor;
   a steam outlet from said reactor to a main turbine;
   a turbine and coupled main generator for supplying electric power to a power grid;
   a condenser for receiving steam from said turbine and for producing condensate; and
   a condensate/feedwater system for supplying condensate from said condenser into the interior of said reactor;
   the improvement to said condensate/feedwater system comprising:
   a reactor coolant injection pump, said pump having an inlet coupled to said condenser for obtaining coolant and an outlet for communicating coolant to the interior of said reactor;
   a second generator mechanically coupled to said turbine and coupled main generator, said second generator converting rotational energy of said turbine and said coupled main generator into electric power, including converting the spindown momentum of said main turbine and coupled generator into electric power;
   a condensate pump electric motor for driving said reactor coolant injection pump; and
   a dedicated power supply, said dedicated power supply originating at said second generator and supplying power to said condensate pump electric motor coupled to said reactor coolant injection pump;
   whereby emergency core coolant can be supplied to said reactor during a loss-of-coolant inventory accident using the spindown momentum of said main turbine and coupled generator.

6. The invention of claim 5 and wherein said condensate/feedwater system includes:
   a condensate pump having a suction on said condenser and an outlet, said condensate pump comprising said reactor coolant injection pump;
   a feedwater pump, said feedwater pump connected in series to said condensate pump having an inlet on the outlet of said condensate pump and a feedwater outlet to provide feedwater to said reactor during normal operation;
   said condensate pump having an outlet bypassing said feedwater pump; and
   means in said condensate pump outlet for preventing backflow from said reactor and the outlet of said feedwater pump to said condensate pump,
   whereby said condensate pump provides coolant to said reactor bypassing said feedwater pump during a loss-of-coolant inventory accident using the spindown momentum of said turbine and said coupled main generator.

7. In a nuclear reactor having water coolant heated to steam to drive a turbine, said turbine having a coupled main generator for supplying power output to a grid, said reactor further including a reactor core cooled by a water coolant injection system, an improved process for operating said water coolant injection system during a loss-of-coolant inventory accident including the steps of:
   providing a second generator;
   mechanically coupling said second generator to said turbine and said coupled main generator:
   converting rotational energy of said turbine and said coupled main generator into electric power using said mechanical coupled second generator comprising converting the spindown momentum of said turbine and said coupled main generator to electric power through said mechanically coupled second generator;
   providing a reactor coolant injection pump having an inlet and an outlet;
   coupling said inlet to a source of coolant;
   coupling said outlet to the interior of said reactor;
   providing an electric motor to drive said reactor coolant injection pump; and
   supplying power from said second generator to said motor during operation of said plant, whereby power to said reactor coolant injection pump includes said power generated from the spindown momentum of said turbine and said coupled main generator.

8. In a nuclear reactor of the type having a reactor core cooled by a process including the steps of:
   providing water coolant in said reactor;

heating portions of said water coolant to steam in said reactor;

providing a turbine for receiving steam and driving a coupled main generator for supplying power output to a grid;

providing a condenser for receiving steam from said turbine and generating coolant for return to said reactor;

providing a condensate pump having an inlet for receiving coolant from said condenser and an outlet;

providing a feedwater pump for receiving coolant from the outlet of said condensate pump and for reintroducing coolant into said reactor, a process for controlling a loss-of-coolant inventory accident including the steps of:

depressurizing said reactor when a loss-of-coolant inventory accident occurs;

providing a bypass line from the outlet of said condensate pump to the interior of said reactor, said bypass line having a one-way flow to prevent backflow into said condensate pump;

providing a second generator mechanically coupled to said turbine and said coupled main generator having a power output separate from said coupled main generator;

converting the spindown momentum of said turbine and said coupled main generator into electric power using said second generator;

supplying electric power from said seoond generator to said condensate pump;

driving said condensate pump by said supplied power during a loss-of-coolant inventory accident; and injecting coolant into said reactor using said condensate pump when said reactor pressure falls below the shutoff head for said condensate pump.

9. In a nuclear power system of the type having a boiling water reactor for providing steam to a turbine, said turbine coupled to a main generator on common shafting for providing electric power output, said reactor normally cooled by a forced circulation cooling system which includes a plurality of pumps and said reactor cooled during a loss-of-coolant inventory accident by an emergency core cooling system, an emergency core cooling power supply comprising:

an auxiliary generator coupled to said shafting of said turbine and main generator for converting spindown momentum of said turbine and coupled main generator to electric power; and dedicated power supply means for supplying power from said auxiliary generator to said emergency core cooling system, whereby emergency coolant injection can be provided to said reactor during a loss-of-coolant inventory accident using the spindown momentum of said turbine and coupled main generator.

* * * * *